United States Patent
Laskowski et al.

(10) Patent No.: US 12,100,247 B2
(45) Date of Patent: Sep. 24, 2024

(54) WINDSHIELD SAFETY SYSTEM

(71) Applicant: Panasonic Automotive Systems Company of America, Division of Panasonic Corporation of North America, Peachtree City, GA (US)

(72) Inventors: Garrett Laskowski, Linden, MI (US); Padhu Kanagaraj, Farmington Hills, MI (US)

(73) Assignee: Panasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 127 days.

(21) Appl. No.: 17/705,790

(22) Filed: Mar. 28, 2022

(65) Prior Publication Data

US 2023/0019606 A1 Jan. 19, 2023

Related U.S. Application Data

(60) Provisional application No. 63/221,752, filed on Jul. 14, 2021.

(51) Int. Cl.
*G07C 5/00* (2006.01)
*G06Q 10/1093* (2023.01)

(52) U.S. Cl.
CPC .......... *G07C 5/006* (2013.01); *G06Q 10/1095* (2013.01)

(58) Field of Classification Search
CPC .................................................... G07C 5/006
See application file for complete search history.

(56) References Cited

U.S. PATENT DOCUMENTS

| | | | | |
|---|---|---|---|---|
| 9,520,006 | B1* | 12/2016 | Sankovsky | G07C 5/02 |
| 10,977,881 | B1* | 4/2021 | Buentello | G06Q 20/405 |
| 2008/0052134 | A1* | 2/2008 | Nowak | G06Q 40/08 |
| | | | | 705/4 |
| 2008/0172258 | A1* | 7/2008 | Weger | G06Q 10/00 |
| | | | | 705/4 |
| 2019/0189007 | A1* | 6/2019 | Herman | G08G 1/0133 |
| 2023/0073188 | A1* | 3/2023 | Hanson | G06Q 40/08 |
| 2023/0290192 | A1* | 9/2023 | Kraft | G07C 5/006 |
| | | | | 705/4 |

OTHER PUBLICATIONS

Wei et al, Technical Challenge and Solution for Vehicle-Mounted AR-HUD Mass commercial Application, International Conference on Optoelectronic and Microelectronic Technology and Application, Proc. of SPIE vol. 11617, 1161740 (Year: 2020).*
De Guzman et al, Analog to Digital HUD Instrument Cluster with Touch Screen Command Center, University of Central Florida Department of Electrical Engineering and Computer Science, (Year: 2010).*

* cited by examiner

*Primary Examiner* — Andre D Boyce
(74) *Attorney, Agent, or Firm* — Laurence S. Roach, Esq.

(57) ABSTRACT

Examples of the present disclosure relate to a system, method, and computer readable medium for windshield safety. A windshield safety system may include a sensor that detects possible damage to a windshield of a vehicle. In an example, the windshield safety system includes a display corrector in the vehicle to alter the display of information in response to a possible damage detection by the sensor. The windshield safety system can also include a driver information system in the vehicle to send an appointment request in response to a possible damage detection by the sensor.

30 Claims, 7 Drawing Sheets

100

200

300

400

WINDSHIELD SAFETY SYSTEM

CROSS-REFERENCE TO RELATED APPLICATIONS

This application claims the benefit of U.S. Provisional Application No. 63/221,752, filed on Jul. 14, 2021, the disclosure of which is hereby incorporated by reference in its entirety for all purposes.

FIELD OF THE INVENTION

The present disclosure generally relates to a method, system, and device for a windshield safety system. More specifically, the present disclosure relates to detection of damage to a windshield or HUD display area on a windshield, routing to alternate displays, notifying the driver, and the driver information system managing the digital scheduling of a repair appointment.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

Windshields in a vehicle commonly refer to the front window of a vehicle which provides visibility while protecting occupants from the elements of the outdoors such as wind, rain, insects, and debris. Windshields are generally made of laminated safety glass, a type of treated glass, which may include two curved sheets of glass with a plastic layer laminated between them for safety, and bonded into the window frame. Damage to the windshield, even when minor, can impair the structural integrity of the overall windshield and impair visibility through the windshield. The windshield of a vehicle may be used as a Heads-Up Display (HUD) and in such a case, cracks, chips, or other physical damage can reduce or completely eliminate the functionality of a windshield based heads-up display.

SUMMARY

Generally, the present techniques relate to a system, method, and computer-readable medium for windshield safety and implementation of the same. A windshield safety system may include a sensor that detects possible damage to a windshield of a vehicle. In an example, the windshield safety system includes a display corrector in the vehicle to alter the display of information in response to a possible damage detection by the sensor. The windshield safety system can also include a driver information system in the vehicle to send an appointment request in response to a possible damage detection by the sensor.

The present techniques further include a method for windshield safety including detecting possible damage to a windshield of a vehicle with a sensor. The method for windshield safety may also alter the display of information with a display corrector in the vehicle in response to a possible damage detection by the sensor. The method for windshield safety may also send, with a driver information system in the vehicle, an appointment request in response to a possible damage detection by the sensor.

The present techniques further include a non-transitory, computer readable storage device for windshield safety comprising instructions that when executed on a processor, cause the processor to detect possible damage to a windshield of a vehicle with a sensor. The instructions when executed on a processor may further alert the display of information with a display corrector in the vehicle in response to a possible damage detection by the sensor. In an example, the instructions when executed on a processor may further send, with a driver information system in the vehicle, an appointment request in response to a possible damage detection by the sensor.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1:
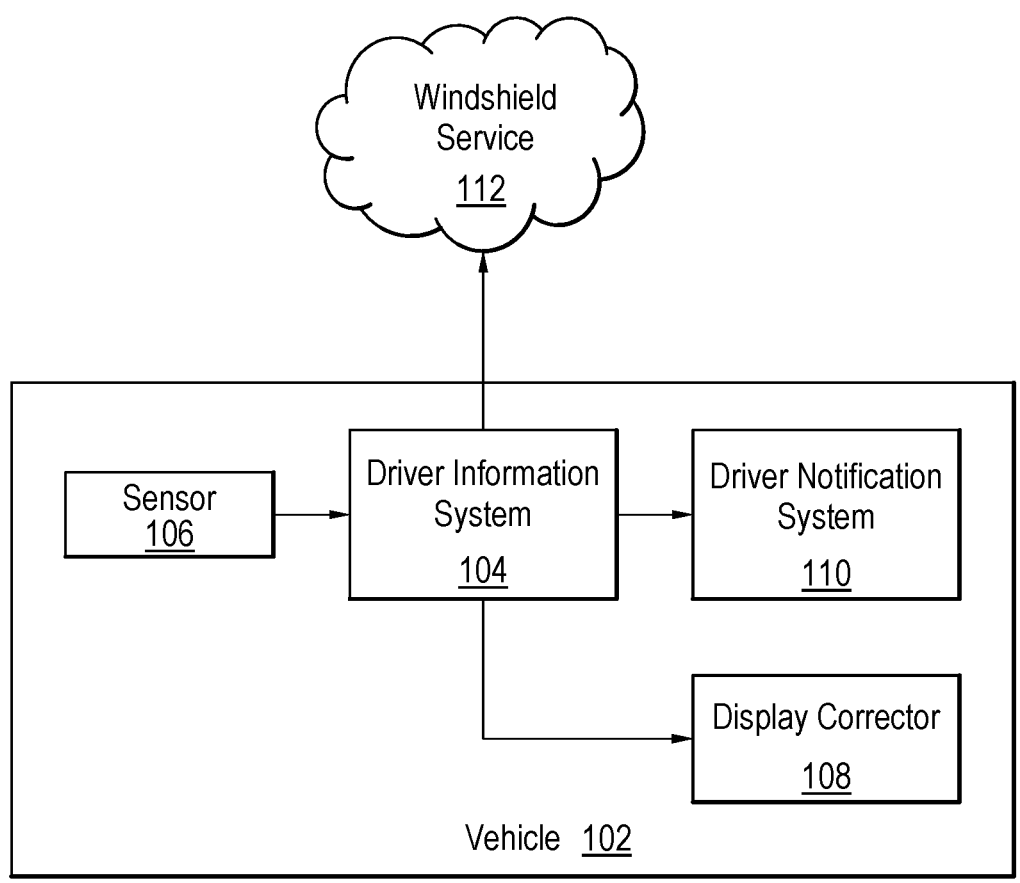
FIG. 1 is a block diagram of an example windshield safety system located inside a vehicle.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

Detection of cracks or chips in the windshield can be used to increase the safety in the vehicle and increase convenience for the user, driver, or owner of a vehicle. The present disclosure includes techniques for automatically scheduling a windshield repair or replacement based on detected damage. In an example, the detection of damage to the windshield could notify the driver either through a Heads-Up Display (HUD), alternative vehicle display, or a separate device personally accessible to the user or owner of the vehicle. Display of damage information may automatically seek alternative display areas. In an example, the screen used to display may be based on a functional status of the windshield and whether or not the HUD information can be displayed intelligibly. In an example, damage alerts or updates can be rerouted or duplicated. Damage alerts and updates may be for example displayed on a vehicle cluster or Center Information Display (CID). As used herein a cluster refers to the electronic instrument cluster and can also be called a CID, digital instrument panel, or digital dash, and includes a set of instrumentation readings to be displayed.

Detection of damage may be done through a number of methods and devices of the vehicle. In an example, the system may use a closed-loop camera system of the vehicle where the HUD's output in the intended area of the windshield is used as a comparison against the camera's input provided to the HUD display device. Based on the detected differences between the output shown on the HUD and the input, distortions can be detected and analyzed to determine if any of the detected distortions in the image are the result of physical damage that can be repaired or replaced for improved safety and functionality. As discussed above, a vehicle responding to detected distortions, the vehicle may compensate display of HUD information by requesting that a HUD module corrects the display, reroutes the information, or duplicates information to the cluster or CID.

In another example, detection of damage may use radar technology, a camera, an optical edge-lit system to detect cracks across the entire windshield. A camera for detecting distortions could be limited in its field of view to the area around the HUD in order to avoid altering display of the HUD area if only a remote portion of the windshield experiences damage. Each method described here could include a number of sensors for detection of potential damage. The system sensors could be connected to the in-vehicle infotainment (IVI) system and the IVI system could connect to a mobile windshield service to schedule repair or replacement according to the user's preference settings. The connected nature of detection of damage, then adjustment of display, and then scheduling of repair in one system reduces unsafe driving time with compromised visibility by automatically scheduling a windshield repair/replacement.

FIG. 1 is a block diagram of an example windshield safety system 100 located inside a vehicle. Arrows in this diagram can be used to show a general direction of information flow. However, this is a simplified representation and is used to illustrate an example aspect of operation and other exchange of information can occur beyond what is shown here.

The windshield safety system 100 is located inside a vehicle 102 and includes a driver information system 104 to manage detection and resolution of windshield damage. The driver information system 104 can be located in the infotainment unit of the vehicle 102. A number of sensors 106 can be provide data to the driver information system 104. In an example, the sensors can include a radar sensor, camera sensor, edge-lit sensors, an accelerometer, or other sensors to detect vehicle events. In an example a vehicle event can include a crash, a sudden acceleration, a distortion of a surface, that either directly or indirectly show damage to a windshield. The sensors 106 can also include a camera that specifically monitors the space on a windshield where a HUD is displayed or intended to be displayed. Monitoring this specific area where a HUD is displayed can provide information to the driver information system 104 about whether the display for the HUD should be moved or adjusted in some way. For example, the sensors 106 can include a closed loop camera system within the vehicle that detects damage or distortion on the windshield in the area of a HUD display. In response, the closed loop camera system of the sensors 106 can notify the driver information system 104 of the issue. The driver information system 104 can take action based on the notification from the sensors 106.

In an example, the driver information system 104 can take action by adjusting the way information is presented to a driver. For example, in response to damage information from the sensors 106, the driver information system 104 may instruct the display corrector 108 to adjust the display location. In an example, the display corrector 108 may adjust the location of the display to a second display. The display corrector 108 may also duplicate the display in a number of locations in case one or more locations are damaged. Increasing the number of displays after damage is detected can increase the likelihood that an undamaged display surface is used as a display surface thereby increasing the likelihood that a user or driver will be able to gain information even in the event of a damaged windshield in the HUD area. In another example, the display corrector 108 may adjust the size or shape of the HUD display within the previous HUD display area in order to avoid areas within the HUD display space that are damaged or distorted according to the sensors 106.

The driver information system 104 can take action in response to damage or distortion of the windshield detected by the sensors 106 by activating a driver notification system 110. The driver notification system 110 may send a notification by a vehicle system to the driver such as through audio speech or other alerting indication. The driver notification system 110 may also provide a notification to the driver using out-of-band technology such as text messages. In an example the driver notification system 110 may have default driver contact preferences stored that are set up by the driver or imported from a driver account stored remotely. In an example, the driver notification system 110 may send a message to a driver account such as their email account, a vehicle specific application, or a social media account. In an example, the driver information system 104 may provide the driver information related to the damage or distortion on their windshield.

The driver information system 104 may also contact a windshield service 112. The driver information system 104 may contact the windshield service through the internet, through wireless data transfer, or by other wireless means. In an example the windshield service 112 may be a mobile windshield service that can itself travel to where a vehicle is located or send a window repair team to that location. In an example, the mobile windshield service can be stationary in a location where the vehicle with the broken windshield must travel to in order to get a new windshield or have the windshield repaired or inspected. The driver information system 104 may notify the driver/user that a windshield service has been contacted 112. A notification from the driver information system 104 to the driver may include a time, location, price, and point of contact for the service to be provided. In an example, the notification from the driver information system 104 to the driver may be added to the driver/user calendar. In an example the driver information system 104 may provide the location and navigation instructions to the display corrector 108. The display corrector 108 may display navigation information to the alternate location of the HUD based on damage detected by the sensors 106.

In an example, the driver information system 104 may have stored a number of user/driver defaults with regard to windshield repair. In an example, a user/driver may have indicated a time range during which the driver information system 104 should look for appointments to repair a windshield from a windshield service 112. In an example a user/driver calendar may be consulted by the driver information system 104 in order to compare the availability of the driver to the availability of a windshield service 112. In an example, the driver information system 104 may consider the distance and estimate travel time when attempting to schedule a windshield service 112 for the vehicle 102. The driver information system 104 may also have stored a default such as rating minimums, price range, or preferred vendors.

The driver information system 104 may store and later transmit to a windshield service 112 specifications of the dimensions, make, model, and material of the windshield that is damaged, needs inspection, or needs replacement. In an example, the driver information system 104 may confirm that a windshield service 112 has a windshield in stock that will match the stored specifications for the vehicle 102 prior to scheduling a service appointment including physical length-width-height dimensions, shape, tint, curvature, or other characteristics that ensure a fitting replacement or conform to user/driver preferences.

Figure 2:
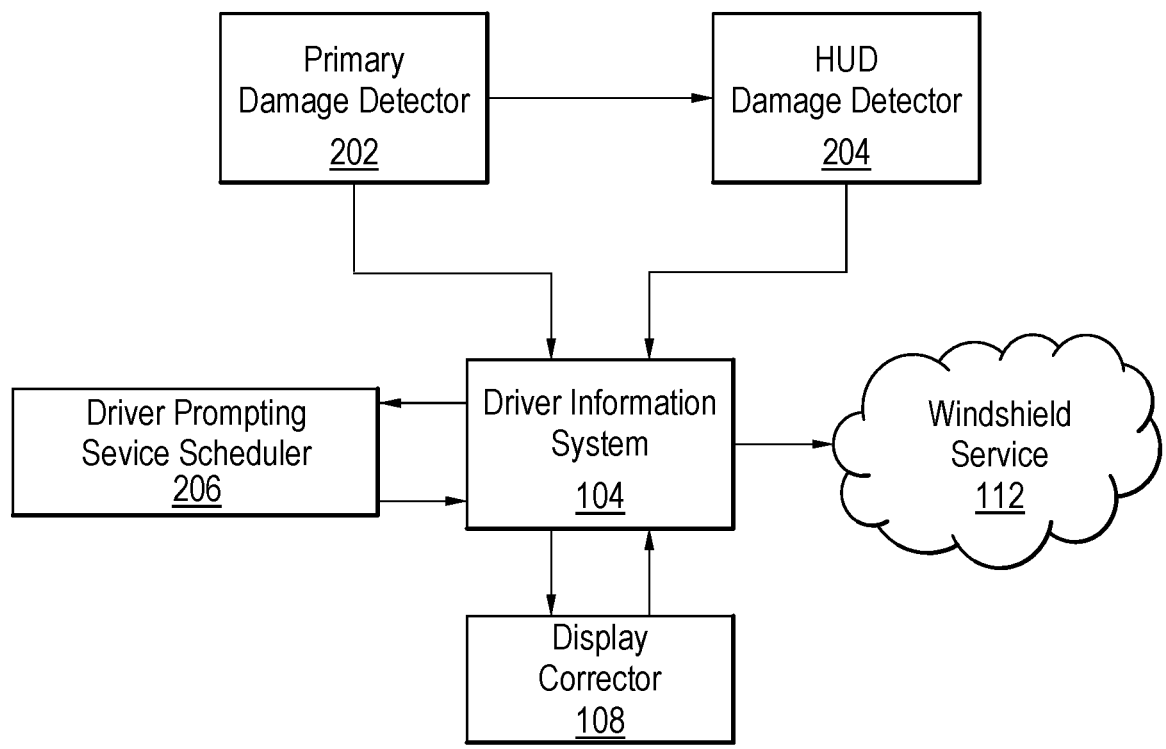
FIG. 2 is a schematic diagram of an example windshield safety system cycles.

FIG. 2 is a schematic diagram of an example windshield safety system cycles 200. Like numbered items are as described with respect to FIG. 1. As before, arrows can show a general flow of information, but are only added to show relationships between various components and are not intended to be an exhaustive or minimum list of what kinds of communications can occur between components.

A vehicle may start by activating the driver information system 104. During operation, the primary damage detector 202 may make checks to determine the likelihood of damage. In an example, the primary damage detector 202 may include a camera, radar, accelerometer, or other sensor equipment. In an example, the primary damage detector 202 may make regular checks on the state of the windshield at predetermined intervals. The primary damage detector 202 may also constantly be taking readings and in the event of the detection of a potentially damaging event, the primary damage detector 202 may inform the driver information system 104 and/or may also alert the HUD damage detector 204. In an example, the HUD damage detector is not powered on until activated based on a signal from the primary damage detector 202.

In the event of a pebble bouncing off of the windshield of the vehicle, the primary damage detector 202 may be an accelerometer that detects the movement of the windshield in a sudden pattern that is interpreted to be a possible damage event. In response, the primary damage detector 202 may send a signal to the HUD damage detector 204 to further determine whether or not the pebble caused damage in the HUD display area or not. The HUD damage detector 204 may include camera monitoring the windshield for cracks. In an example, the HUD damage detector 204 may compare a picture of a windshield taken after receiving a signal from the primary damage detector 202 to a picture of the windshield from before receiving a signal from the primary damage detector 202. In an example, the HUD damage detector 204 may take a picture each time a vehicle starts to serve as a reference to compare any later pictures of the windshield to better determine if a crack has newly appeared. In an example, the HUD damage detector 204 monitors only the HUD display area of a windshield as outlined by the area onto which a HUD is projected.

In an example, even if no windshield damage is detected by the HUD damage detector 204, there may be some distortion to the HUD display area. In an example, the HUD damage detector 204 may run a diagnostic that compares a picture of a test image displayed on the HUD area of a windshield at two different times. As discussed above, the HUD damage detector 204 may take a picture of a test image displayed on a HUD of a windshield at the time a vehicle starts up and compare that to an image of the test image displayed on the HUD after the HUD damage detector 204 receives a signal from the primary damage detector 202. In comparing these two pictures of the test photo being displayed by the HUD, a determination can be made as to whether or not the windshield is damaged or warmed in a way that is distorting the HUD image. In response to detecting that a HUD is distorted or damaged, the display corrector 108 may be sent a notification that the display is to be moved or duplicated and the display corrector 108 will inform the driver information system 104 of the location to which the display will be moved or duplicated.

In response to detecting that a HUD is distorted or damaged, the HUD damage detector 204 may provide a signal indicating this damage or distortion to the driver information system 104. In response to the signal of damage or distortion, the driver information system 104 may signal for a driver prompted service scheduler 206 to schedule a service.

The driver prompted service scheduler 206 may receive a signal from the driver information system 104 and in response may contact the user/driver to obtain input about scheduling a windshield service 112. In an example, the driver prompted service scheduler 206 may present the user/driver with the next available appointment with the windshield service 112 and request confirmation from the user/driver if they would like to accept or decline the appointment. In an example, the driver prompted service scheduler 206 may be communicating to the user/driver through SMS, an application, the cluster, or a CID. The driver prompted service scheduler 206 may request other information from the driver including a request for a price range, a request for a date range, a request for a brand, a request for a time of service range, or any other input for the scheduling of an appointment and ordering of a windshield. The driver prompted service scheduler 206 may provide the driver response to the driver information system 104 to be sent to the windshield service 112 for scheduling. In an example the driver prompted service scheduler 206 may be used as a driver notification system to alert the user/driver to the possibility of damage to the windshield, the extent of the known damage to the windshield, and any distortions measured. After an appointment has been scheduled, the driver prompted service scheduler 206 may provide updates such as estimated time until completion of the repair or may provide reminders of the upcoming appointment through one or more channels to reach the user/driver.

Figure 3:
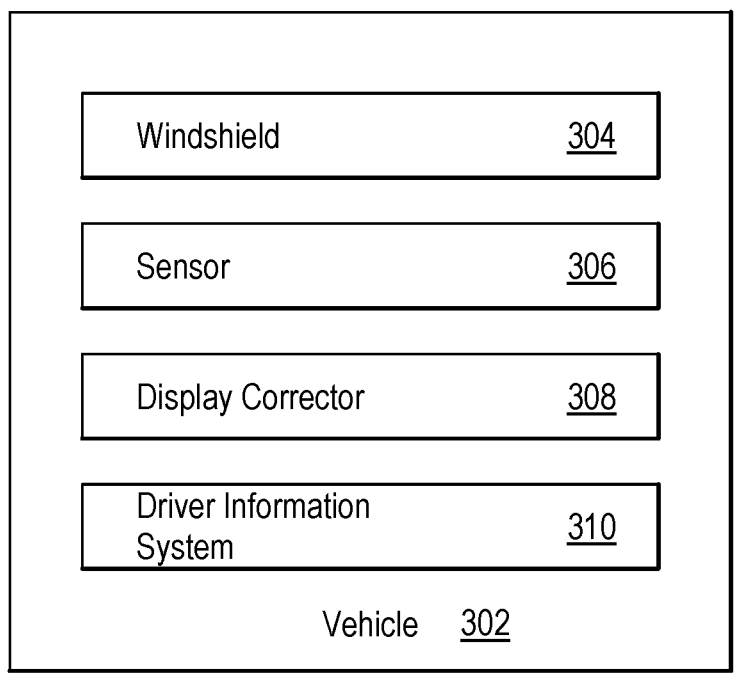
FIG. 3 is a block diagram of an example system 300 for windshield safety.

FIG. 3 is a block diagram of an example system 300 for windshield safety. The system 300 for windshield safety of a vehicle 302 can include a windshield 304 and a sensor 306 that detects possible damage to the windshield 304. In an example, the sensor 306 can be a camera, a radar system, an optical edge-light sensor, or an accelerometer. In some cases, multiple sensors may be present to increase the chances of accurate detection of damage or distortion.

The system 300 for windshield safety can include a display corrector 308 in the vehicle to alter the display of information in response to a possible damage detection by the sensor. In an example, alteration of the display of information by the display corrector 308 can include duplicating the display of information across at least two displays in the vehicle. Alteration of the display information may include moving the display of information to at least one of a CID, a device of the user, and a window other than the windshield.

The system 300 for windshield safety can include a driver information system 310 in the vehicle to send an appointment request in response to a possible damage detection by the sensor 306. In an example, the driver information system 310 sends specifications of the windshield 304 in response to the possible damage detection by the sensor 306. The driver information system 310 can provide a notification to a user of the possible damage detected by the sensor 306. In this example, the notification is provided to the user by a message sent to a device other than the vehicle 302. The driver information system 310 may also provide a notification to a user of a confirmation of the appointment request sent and wherein the notification includes at least one of a time of the appointment, a location of the appointment, a price of the appointment, navigation instructions to the appointment, a name of a vendor for the appointment. The driver information system 310 may provide a request to a user to provide input, where the input is included in the appointment request.

In other embodiments, a Heads-Up Display (HUD) damage detector may be used to compare a display of a HUD image on the windshield from after a possible damage detection by the sensor to an intended display of the HUD image.

Figure 4:
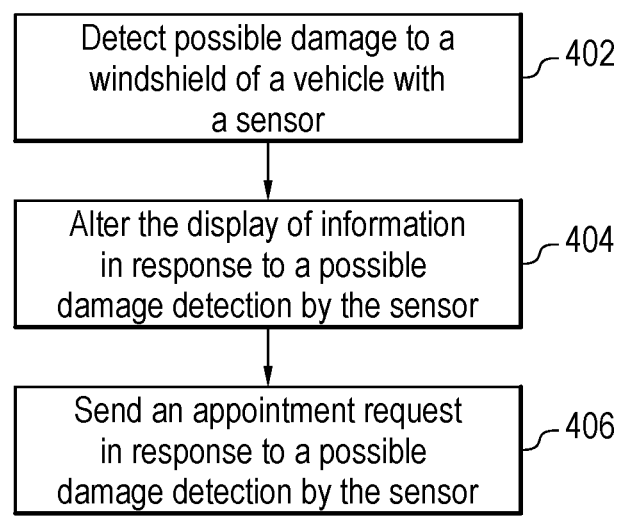
FIG. 4 is a process flow diagram of an example method 400 for implementing windshield safety.

FIG. 4 is a process flow diagram of an example method 400 for implementing windshield safety. At block 402, the method 400 for windshield safety of a vehicle can include detecting possible damage to a windshield of a vehicle with a sensor. In an example, the sensor can be a camera, a radar system, an optical edge-light sensor, or an accelerometer. In some cases, multiple sensors may be present to increase the chances of accurate detection of damage or distortion.

At block 404, the method 400 for windshield safety of a vehicle can include altering the display of information with a display corrector in the vehicle in response to a possible damage detection by the sensor. In an example, alteration of the display of information by the display corrector can include duplicating the display of information across at least two displays in the vehicle. Alteration of the display information may include moving the display of information to at least one of a CID, a device of the user, and a window other than the windshield.

At block 406, the method 400 for windshield safety of a vehicle can include sending, with a driver information system in the vehicle, an appointment request in response to a possible damage detection by the sensor. In an example, the driver information system sends specifications of the windshield in response to the possible damage detection by the sensor. The driver information system can provide a notification to a user of the possible damage detected by the sensor. In this example, the notification is provided to the user by a message sent to a device other than the vehicle. The driver information system may also provide a notification to a user of a confirmation of the appointment request sent and wherein the notification includes at least one of a time of the appointment, a location of the appointment, a price of the appointment, navigation instructions to the appointment, a name of a vendor for the appointment. The driver information system may provide a request to a user to provide input, where the input is included in the appointment request.

In other embodiments, the method 400 may include a Heads-Up Display (HUD) damage detector which may be used to compare a display of a HUD image on the windshield from after a possible damage detection by the sensor to an intended display of the HUD image.

Figure 5:
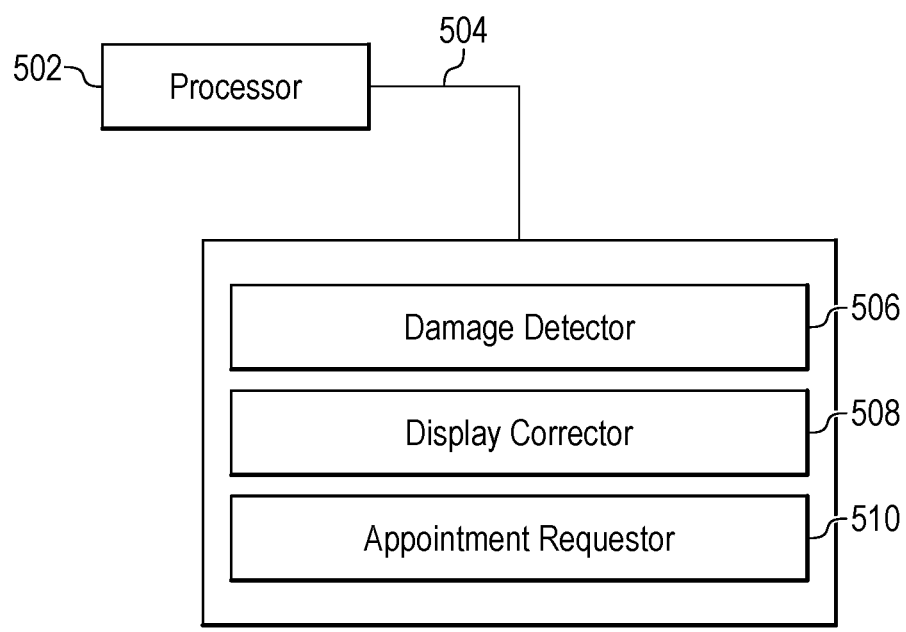
FIG. 5 is a block diagram of an example non-transitory computer-readable storage medium for implementing a windshield safety system.

FIG. 5 is a block diagram of an example non-transitory computer-readable storage medium 500 for implementing a windshield safety system. A processor 502 may execute instructions delivered to it by an electrically and communicatively connected bus 504. The bus 504 may connect the processor to the computer-readable storage medium 500.

The computer-readable storage medium 500 can include a damage detector 506 to detect possible damage to a windshield of a vehicle with a sensor. In an example, the sensor can be a camera, a radar system, an optical edge-light sensor, or an accelerometer. In some cases, multiple sensors may be present to increase the chances of accurate detection of damage or distortion.

The computer-readable storage medium 500 can include a display corrector 508 to alert the display of information with a display corrector in the vehicle in response to a possible damage detection by the sensor. In an example, alteration of the display of information by the display corrector 508 can include duplicating the display of information across at least two displays in the vehicle. Alteration of the display information may include moving the display of information to at least one of a CID, a device of the user, and a window other than the windshield.

The computer-readable storage medium 500 can include an appointment requestor 510 to send, with a driver information system in the vehicle, an appointment request in response to a possible damage detection by the sensor. In an example, the driver information system sends specifications of the windshield in response to the possible damage detection by the sensor. The driver information system can provide a notification to a user of the possible damage detected by the sensor. In this example, the notification is provided to the user by a message sent to a device other than the vehicle. The driver information system may also provide a notification to a user of a confirmation of the appointment request sent and wherein the notification includes at least one of a time of the appointment, a location of the appointment, a price of the appointment, navigation instructions to the appointment, a name of a vendor for the appointment. The driver information system may provide a request to a user to provide input, where the input is included in the appointment request.

In other embodiments, the method 400 may include a Heads-Up Display (HUD) damage detector which may be used to compare a display of a HUD image on the windshield from after a possible damage detection by the sensor to an intended display of the HUD image.

Figure 6:
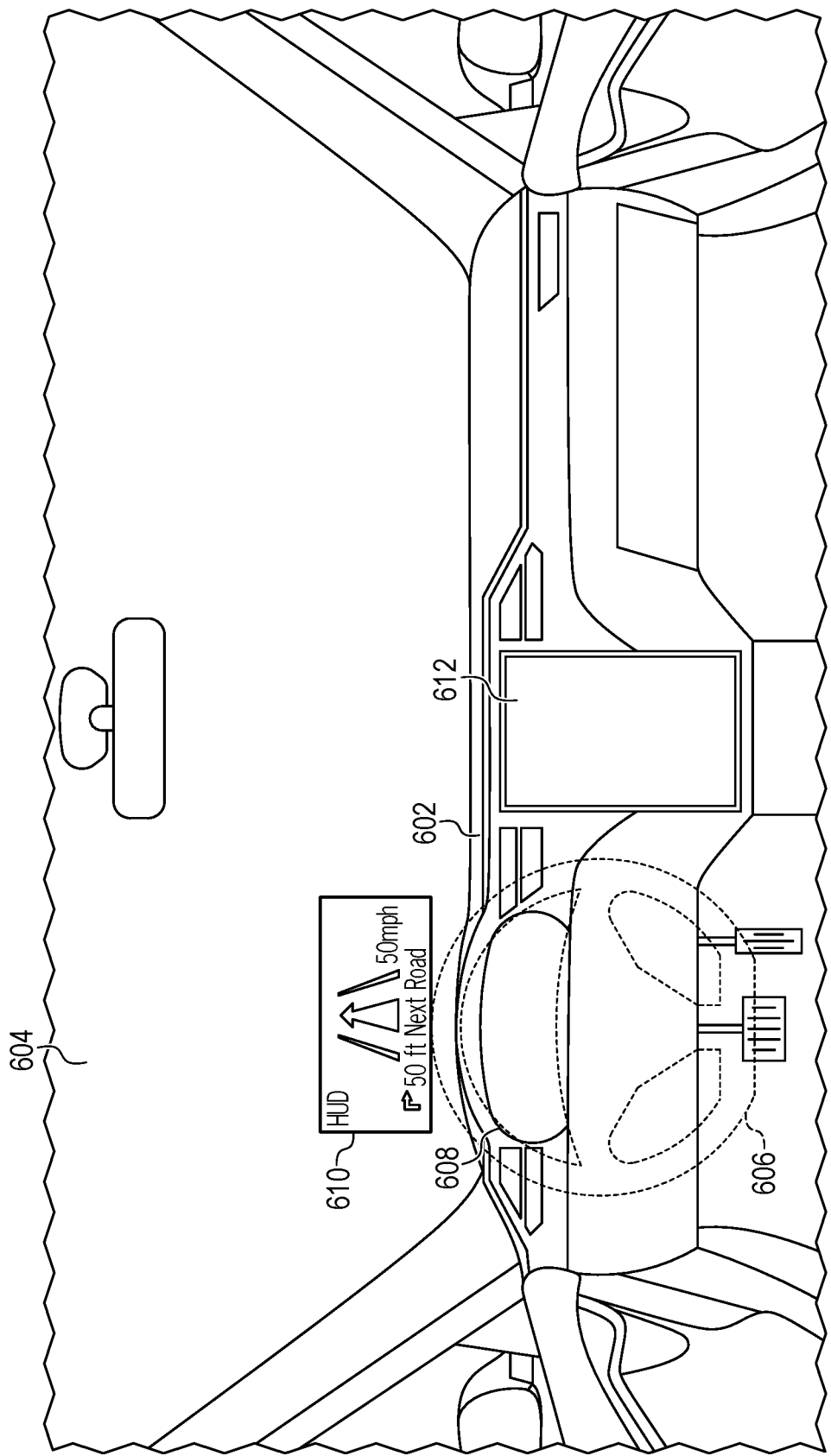
FIG. 6 is a diagram of an example vehicle interior for implementing a windshield safety system.

FIG. 6 is a diagram of an example vehicle interior 600 for implementing a windshield safety system. Items shown are for illustrative purposes and do not convey exact size, scale, or shape. Further, additional items not shown may be used in implementing the system. Dotted lines can be used to allow view of other items behind the item with the dotted lines as outlines.

The vehicle interior 600 implementing a windshield safety system can include a dashboard 602 which is below the front windshield 604 of the vehicle. The dashboard 602 can have a steering wheel 606 attached to it as well as a cluster 608 which displays various indicators and readings from the vehicle for a driver. A Heads-Up display (HUD) 610 can be displayed on the windshield 604 and can show directions, turns, miles per hour, estimated times of arrival, and other information for a driver to view. In an example, the HUD 610 is displayed in a position that is aligned with the steering wheel 606 and the cluster 608. This position above the steering wheel 606 allows a driver to more easily view the HUD 610 without diverting their attention from the road. The CID 612 may be attached to the dashboard 602 and aligned to the dashboard 602 center so that the CID 612 is equally viewable by the driver and a passenger in the vehicle.

Figure 7:
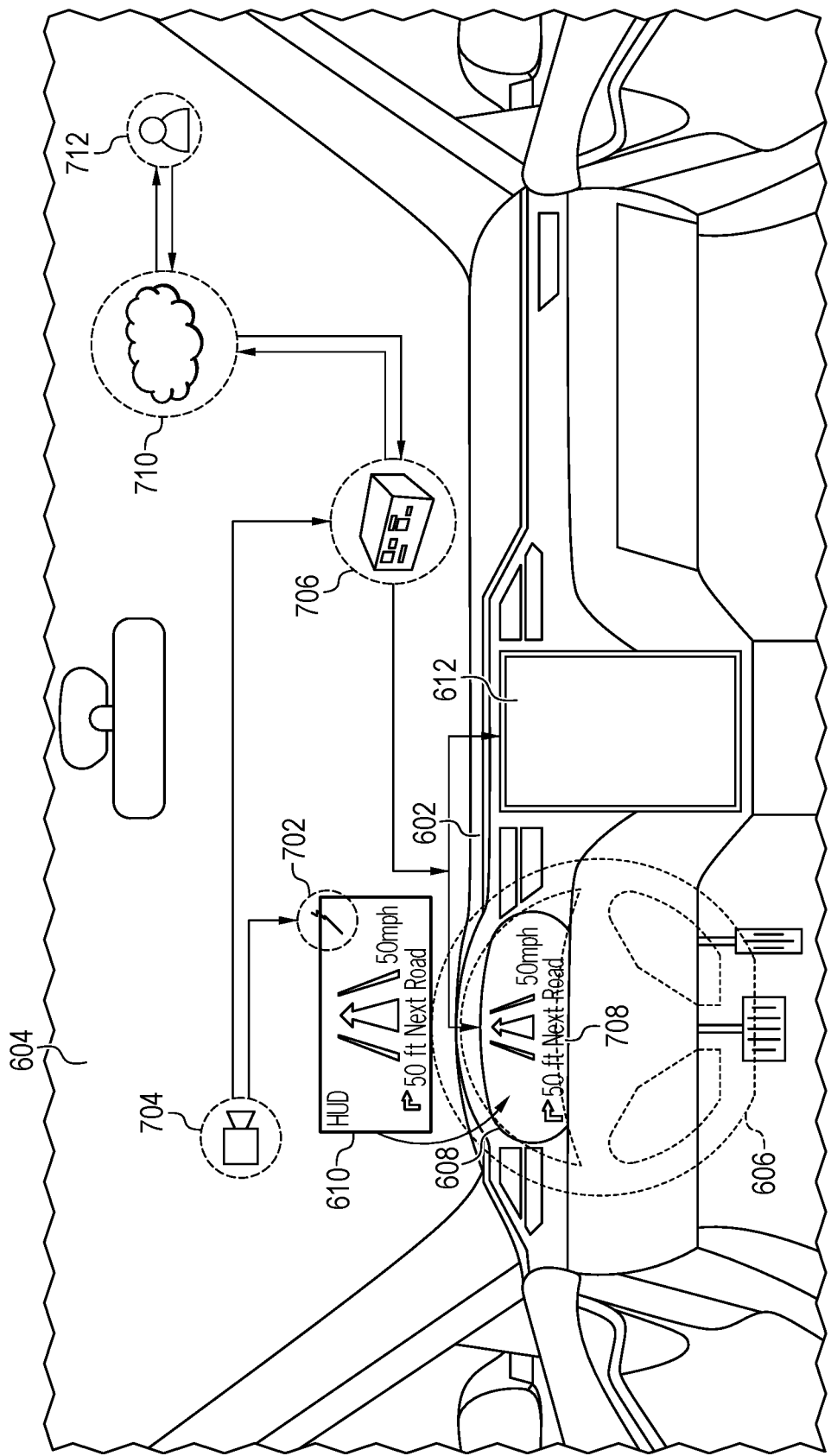
FIG. 7 is a schematic diagram of an example adjusted vehicle interior for implementing a windshield safety system.

FIG. 7 is a schematic diagram of an example adjusted vehicle interior 700 for implementing a windshield safety system. Items that are shown in FIG. 6 have been given the same reference number in FIG. 7. Dashed lines circling items can be used to indicate that an item is being shown for convenience but is likely not in that physical space, but is the one performing a function described herein. As used with respect to this figure, arrows can indicate a general flow of information and/or action, however, are provided for general information and do not describe an exact sequence of particular number of processes an instead show a general relationship and action between items shown.

The adjusted vehicle interior 700 in this example is responding to a change in the integrity of the windshield 604. In an example, the windshield 604 has a crack 702. In an example, this crack may be in the same area as the displayed HUD 610 on the windshield 604, in an example the crack may develop in a location on the windshield 604 in a location other than the displayed HUD 610.

A camera or sensor 704 may detect the crack in the windshield 604. In an example, the camera or sensor 704 may detect the particular location of the crack 702 in the windshield 604, in other cases, the camera or sensor 704 may detect the existence of a crack 702 in the windshield without identifying a particular location of the crack 702. In response to detecting the crack 702 in the windshield 604, the camera or sensor 704 may provide its detection to the cockpit domain controller (CDC) 706. In response, the CDC 706 can instruct the alteration of display of driver critical information 708 from the windshield onto an alternate display. In an example, the driver critical information 708 can be moved from display on the HUD 610 projected on the windshield to be instead displayed on the cluster 708. In an example the driver critical information 708 can be displayed on the CID 612. In an example the driver critical information 708 can be moved to both the cluster 608 and the CID 612. In an example, the driver critical information can be moved to an alternate display in response to a detection that the crack 702 is in the display field of the HUD 610 on the windshield 604.

In an example, the CDC 706 additionally sends a request to a remote service or remote device. The remote service or device can be a server or network of servers commonly referred to as a cloud or cloud computing environment. In an example, the CDC 706 may send the information about the driver, the vehicle, the detection of a crack, the vehicle location, the current destination of the vehicle, the home address of the vehicle, the home address of the user associated with the vehicle, and other relevant information. In an example, the CDC 706 may not itself provide all of this information, but instead may provide enough information that the cloud computing environment 710 may identify an account including other information related to the vehicle or owner that may be used in further operations reactive to the crack in the windshield 702. In an example, the cloud computing environment may use the intended destination of the vehicle as a starting point location from which to identify the nearest available preferred service center 712 where the windshield can be repaired. Based on either default settings or customized user preference settings, a preferred service center 712 may be selected based on a number of criteria and information provided by the CDC 706 related to the vehicle, the vehicle driver, the owner, the destination of the vehicle, the schedule of the driver/owner, the price of the service request, and other factors for consideration of selection of a service center.

In response to receiving the information from the CDC 706 related to the damaged windshield 604, the preferred service center 712 may return an appointment or number of appointments from which the CDC 706 may choose to confirm. Based on the confirmation of the CDC an appointment for service at the preferred service center 712 may be scheduled. In response to confirmation of an appointment for service, the CDC 706 may provide to the owner/driver written confirmation of the appointment via electronic communications to a messaging or email client of the user/driver. In an example, the CDC 706 may provide confirmation of the scheduled appointment to the driver/owner via display on the cluster 708 and/or the CID 612. In an example, an appointment for service may be set up but not confirmed unless confirmed through interaction with the CID 612. For example, while in some cases an appointment may be automatically made, in other cases, an appointment or number of appointments may be presented in the vehicle for selection by the owner/driver or a passenger with access to the CID 612. The confirmation of appointment would then be sent by the CDC 706 to the cloud computing environment 710 to confirm the appointment with the preferred service provider 712. In each case, once a confirmation of an appointment is made, a notification may be provided to the owner/driver of the vehicle both through digital communications to another device or service such as their phone or email service. Alternatively, additional confirmation may be made via display on at least one of the cluster 708, CID 612, or both. In an example where the crack 702 is not in the location of the HUD 610 being displayed on the windshield 604, confirmation and alerts regarding the crack itself or the confirmation of a service appointment may be made to the HUD 610 display location on the windshield 604.

While the invention may be susceptible to various modifications and alternative forms, specific embodiments have been shown by way of example. However, it should be understood that the invention is not intended to be limited to the particular forms disclosed. Rather, the invention is to cover all modifications, equivalents and alternatives falling within the spirit and scope of the invention as defined by the following appended claims.

What is claimed is:
1. A system for windshield safety, comprising:
   a physical sensor that detects possible damage to a windshield of a vehicle;
   a display corrector in the vehicle to alter a physical location of a display of information in the vehicle in response to a possible damage detection by the physical sensor; and
   a driver information system in the vehicle to send an appointment request in response to a possible damage detection by the physical sensor.
2. The system of claim 1, wherein the driver information system sends specifications of the windshield in response to the possible damage detection by the physical sensor.
3. The system of claim 1, comprising a Heads-Up Display (HUD) damage detector to compare a display of a HUD image on the windshield from after a possible damage detection by the physical sensor to an intended display of the HUD image.

4. The system of claim 1, wherein the physical sensor is at least one of a camera, a radar system, an optical edge-light sensor, and an accelerometer.

5. The system of claim 1, wherein alteration of the physical location of the display of information comprises duplicating the display of information across at least two displays in the vehicle.

6. The system of claim 1, wherein alteration of the physical location of the display information comprises moving the display of information to at least one of a Center Information Display (CID), a device of the user, and a window other than the windshield.

7. The system of claim 1, wherein the driver information system provides a notification to a user of the possible damage detected by the physical sensor.

8. The system of claim 7, wherein the notification is provided to the user by a message sent to a device other than the vehicle.

9. The system of claim 1, wherein the driver information system provides a notification to a user of a confirmation of the appointment request sent and wherein the notification includes at least one of a time of the appointment, a location of the appointment, a price of the appointment, navigation instructions to the appointment, a name of a vendor for the appointment.

10. The system of claim 1, wherein the driver information system provides a request to a user to provide input, where the input is included in the appointment request.

11. A method for windshield safety, comprising:
detecting possible damage to a windshield of a vehicle with a physical sensor;
altering a physical location of a display of information with a display corrector in the vehicle in response to a possible damage detection by the physical sensor; and
sending, with a driver information system in the vehicle, an appointment request in response to a possible damage detection by the physical sensor.

12. The method of claim 11, wherein the driver information system sends specifications of the windshield in response to the possible damage detection by the physical sensor.

13. The method of claim 11, comprising comparing a display of a Heads-Up Display (HUD) image on the windshield from after a possible damage detection to an intended display of the HUD image.

14. The method of claim 11, wherein the physical sensor is at least one of a camera, a radar system, an optical edge-light sensor, and an accelerometer.

15. The method of claim 11, wherein alteration of the physical location of the display of information comprises duplicating the display of information across at least two displays in the vehicle.

16. The method of claim 11, wherein alteration of the physical location of the display information comprises moving the display of information to at least one of a Center Information Display (CID), a device of the user, and a window other than the windshield.

17. The method of claim 11, wherein the driver information system provides a notification to a user of the possible damage detected by the physical sensor.

18. The method of claim 17, wherein the notification is provided to the user by a message sent to a device other than the vehicle.

19. The method of claim 11, wherein the driver information system provides a notification to a user of a confirmation of the appointment request sent and wherein the notification includes at least one of a time of the appointment, a location of the appointment, a price of the appointment, navigation instructions to the appointment, a name of a vendor for the appointment.

20. The method of claim 11, wherein the driver information system provides a request to a user to provide input, where the input is included in the appointment request.

21. A non-transitory, computer readable storage device for windshield comprising instructions that when executed on a processor, cause the processor to:
detect possible damage to a windshield of a vehicle with a physical sensor;
alert a physical location of a display of information with a display corrector in the vehicle in response to a possible damage detection by the physical sensor; and
send, with a driver information system in the vehicle, an appointment request in response to a possible damage detection by the physical sensor.

22. The non-transitory, computer readable storage device of claim 21, wherein the driver information system sends specifications of the windshield in response to the possible damage detection by the physical sensor.

23. The non-transitory, computer readable storage device of claim 21, comprising comparing a display of a Heads-Up Display (HUD) image on the windshield from after a possible damage detection to an intended display of the HUD image.

24. The non-transitory, computer readable storage device of claim 21, wherein the physical sensor is at least one of a camera, a radar system, an optical edge-light sensor, and an accelerometer.

25. The non-transitory, computer readable storage device of claim 21, wherein alteration of the physical location of the display of information comprises duplicating the display of information across at least two displays in the vehicle.

26. The non-transitory, computer readable storage device of claim 21, wherein alteration of the physical location of the display information comprises moving the display of information to at least one of a Center Information Display (CID), a device of the user, and a window other than the windshield.

27. The non-transitory, computer readable storage device of claim 21, wherein the driver information system provides a notification to a user of the possible damage detected by the physical sensor.

28. The non-transitory, computer readable storage device of claim 27, wherein the notification is provided to the user by a message sent to a device other than the vehicle.

29. The non-transitory, computer readable storage device of claim 21, wherein the driver information system provides a notification to a user of a confirmation of the appointment request sent and wherein the notification includes at least one of a time of the appointment, a location of the appointment, a price of the appointment, navigation instructions to the appointment, a name of a vendor for the appointment.

30. The non-transitory, computer readable storage device of claim 21, wherein the driver information system provides a request to a user to provide input, where the input is included in the appointment request.

* * * * *